(12) United States Patent
Aono

(10) Patent No.: US 8,917,246 B2
(45) Date of Patent: Dec. 23, 2014

(54) INPUT TERMINAL APPARATUS

(75) Inventor: Tomotake Aono, Yokohama (JP)

(73) Assignee: Kyocera Corporation, Kyoto (JP)

( * ) Notice: Subject to any disclaimer, the term of this patent is extended or adjusted under 35 U.S.C. 154(b) by 266 days.

(21) Appl. No.: 12/665,693

(22) PCT Filed: Jun. 19, 2008

(86) PCT No.: PCT/JP2008/061195
§ 371 (c)(1),
(2), (4) Date: Apr. 6, 2010

(87) PCT Pub. No.: WO2008/156129
PCT Pub. Date: Dec. 24, 2008

(65) Prior Publication Data
US 2010/0188348 A1  Jul. 29, 2010

(30) Foreign Application Priority Data

Jun. 20, 2007 (JP) .................................. 2007-162725

(51) Int. Cl.
*G06F 3/041* (2006.01)
*G06F 3/02* (2006.01)
*G06F 3/023* (2006.01)
*G06F 3/0488* (2013.01)

(52) U.S. Cl.
CPC ............ *G06F 3/0219* (2013.01); *G06F 3/0238* (2013.01); *G06F 3/04886* (2013.01)
USPC .......................................... 345/173; 345/169

(58) Field of Classification Search
USPC .......................... 345/173–178, 156, 168, 169
See application file for complete search history.

(56) References Cited

U.S. PATENT DOCUMENTS

| | | | |
|---|---|---|---|
| 6,690,382 B1 * | 2/2004 | Tanigawa et al. ............. | 345/593 |
| 7,504,967 B2 | 3/2009 | Griffin | |
| 2003/0201982 A1 * | 10/2003 | Iesaka ........................... | 345/168 |
| 2004/0198249 A1 | 10/2004 | Griffin | |
| 2008/0034309 A1 * | 2/2008 | Louch et al. .................. | 715/766 |
| 2009/0195508 A1 | 8/2009 | Griffin | |

FOREIGN PATENT DOCUMENTS

JP          7-006828          1/1995
(Continued)

OTHER PUBLICATIONS

Notification of Reasons for Refusal (English translation) for JP 179,668/2011, mailed Oct. 11, 2011, 2 pages.

(Continued)

*Primary Examiner* — Stephen Sherman
(74) *Attorney, Agent, or Firm* — Duane Morris LLP

(57) ABSTRACT

A layout function unit 4 controls a display unit 2 to display a shortcut key layout at activation of the display unit 2 and, after a predetermined period of time from the activation of the display unit 2, to change a display to a normal key layout. In addition, the layout function unit 4 inserts a blank template as a changeover screen when changing the display from the shortcut key layout to the normal key layout and, when detecting input to a touch panel 1 during a display of the changeover screen, cancels the changeover of the display to the normal key layout and displays the shortcut key layout.

16 Claims, 7 Drawing Sheets

(56) References Cited

FOREIGN PATENT DOCUMENTS

| | | |
|---|---|---|
| JP | 2001-196361 | 7/2001 |
| JP | 2001-509290 | 7/2001 |
| JP | 2002-000977 | 1/2002 |
| JP | 2002-099368 | 4/2002 |
| JP | 2004-129839 | 4/2004 |
| JP | 2005-095696 | 4/2005 |
| JP | 2005-110186 A | 4/2005 |
| JP | 2006-081761 | 3/2006 |
| JP | 2006-096428 | 4/2006 |
| JP | 2006-129268 | 5/2006 |
| JP | 2006-185064 | 7/2006 |
| JP | 2007-133884 | 5/2007 |
| JP | 2007-149122 A | 6/2007 |
| WO | WO-2005/064444 | 7/2005 |

OTHER PUBLICATIONS

Office Action from Japanese Patent Application No. 2007-162725, mailed on Jun. 21, 2011.
Office Action from Japanese Patent Application No. 2007-162725, mailed Sep. 27, 2011, 6 pages.
Official Decision of Rejection, with English translation, for JP 2006-227972, mailed Jan. 17, 2012, 2 pages.
Official Decision of Rejection, with English translation, for JP 2011-179668, mailed Jan. 17, 2012, 4 pages.
Office Action dated Jan. 8, 2013 from corresponding Japanese Patent Application No. 2011-179668, 9 pages.
JP-2007-162725 Office Action dated Nov. 13, 2012.
Office Action dated Jul. 9, 2013 from corresponding Japanese Patent Application 2011-179668 (statement of relevance included), 7 total pages.

* cited by examiner

--PRIOR ART--

INPUT TERMINAL APPARATUS

CROSS REFERENCE TO RELATED APPLICATION

This application is a US National Phase Application of International Application No. PCT/JP2008/061195 (filed on Jun. 19, 2008), which claims priority to and the benefit of Japanese Patent Application No. 2007-162725 (filed on Jun. 20, 2007), the entire contents of which are incorporated herein by reference.

TECHNICAL FIELD

The present invention relates to an input terminal apparatus having a touch panel.

BACKGROUND ART

A conventional terminal apparatus such as a cellular phone or the like having a touch panel is capable of changing a key layout of a standby screen by user's operation and displaying the key layout in accordance with conditions in passive situations such as reception of an e-mail, reception of a voice call and the likes. For example, it is possible to arrange shortcut keys such as an e-mail button, an address button, a calculator button and the likes in addition to a normal key layout on the standby screen, and also to display the key layout in accordance with situations such as an in-box button or an answer button when receiving an e-mail or a voice call, respectively.

As the conventional art, there is a display control apparatus designed so that each button or each touch panel has an input function even when the function is not displayed on the display (see Patent Document 1). The touch panel of the conventional art is shown in FIG. 7. There are touch panel areas P1 to P6 and display buttons D1 to D6 corresponding to the areas, respectively. For example, when a user presses each of the touch panel areas P1 to P6 on a navigation screen, each of the display buttons D1 to D6 performs a corresponding function. Then, when the display is changed from the navigation screen to a TV screen, the display buttons D1 to D6 disappear from the screen so as to display the TV screen. Although the display buttons D1 to D6 are not displayed, navigation functions operate when the user presses the touch panel areas P1 to P6.

Patent Document 1: Japanese Utility Model Application Laid-Open No. 7-6828

SUMMARY OF INVENTION

Technical Problem

As described above, the conventional terminal apparatus having a touch panel is capable of displaying a key layout in accordance with conditions when an event such as reception of an e-mail or reception of a voice call occurs. For example, the apparatus displays an in-box button when receiving an e-mail and an answer button when receiving a voice call. However, when the user desires to use an application for sending a voice call, writing an e-mail or the like with the conventional terminal apparatus having the touch panel in a standby state where there is no event occurs, the user needs to operate numeric keys or arrow keys displayed by default so as to activate the desired function.

In addition, when a user operates the terminal apparatus having the touch panel, it is sometimes desirable to operate with a finger rather than operating with a stylus by taking out the stylus separately prepared. For example, when the user writes an e-mail, since it takes a time and a number of keys are used to input characters, it is suitable to use the stylus. On the other hand, for sending a voice call, it is suitable to operate with a finger so as to operate immediately after the user holds the terminal apparatus without taking the stylus out.

However, with a default key layout of numeric keys, arrow keys and the likes displayed in the standby state where there is no event occurs, it is hard for the user to operate by the finger for a reason that the keys are small.

In consideration of such problems, it is an object of the present invention to provide an input terminal apparatus capable of operating functions with a finger easily, in order to operate functions such as sending a voice call, activating a camera, and the likes that do not need complex operations but a user wants to operate immediately when the user holds the terminal apparatus, without a necessity to take the stylus out.

Solution to Problem

An input terminal apparatus in accordance with the present invention includes: a display unit for displaying a plurality of input keys to receive input; a touch panel disposed in association with the display unit and in front of the display unit; and a display control unit for controlling activation of the display unit, wherein the display control unit controls the display unit to display a first input key group to prompt the input to the touch panel at activation of the display unit and, after a predetermined period of time from the activation of the display unit, to change a display from the first input key group to prompt input to the touch panel to a second input key group to prompt input to the touch panel.

In accordance with the present invention, it is preferred that a predetermined image is inserted as a changeover screen when changing the display from the first input key group to the second input key group. In addition, in accordance with the present invention, it is preferred that when input to the touch panel is detected during a display of the changeover screen, the input terminal apparatus cancels the changeover of a display to the second input key group and displays the first input key group. Moreover, it is preferred that when input to the touch panel is detected during the display of the changeover screen, the input terminal apparatus receives the input as input corresponding to the first input key group.

It is preferred that the first input key group is set to be displayed dedicatedly for when the display unit is activated, while the second input key group is set as a default display of the display unit. It is also preferred that the first input key group is configured so that a function assigned to a key can be changed.

It is preferred that the first input key group includes a key assigned with a function in association with activation of an application last ended. It is also preferred that the first input key group includes a key assigned with a function in association with activation of an application most frequently used.

Advantageous Effects on Invention

According to the present invention, since shortcut keys are displayed for a few seconds after activation of a display unit for displaying a key group to receive a user's operation and before a display of a normal key layout, the user can operate easily by fingers immediately after holding the terminal apparatus without taking a stylus out.

DESCRIPTION OF EMBODIMENTS

Figure 1:
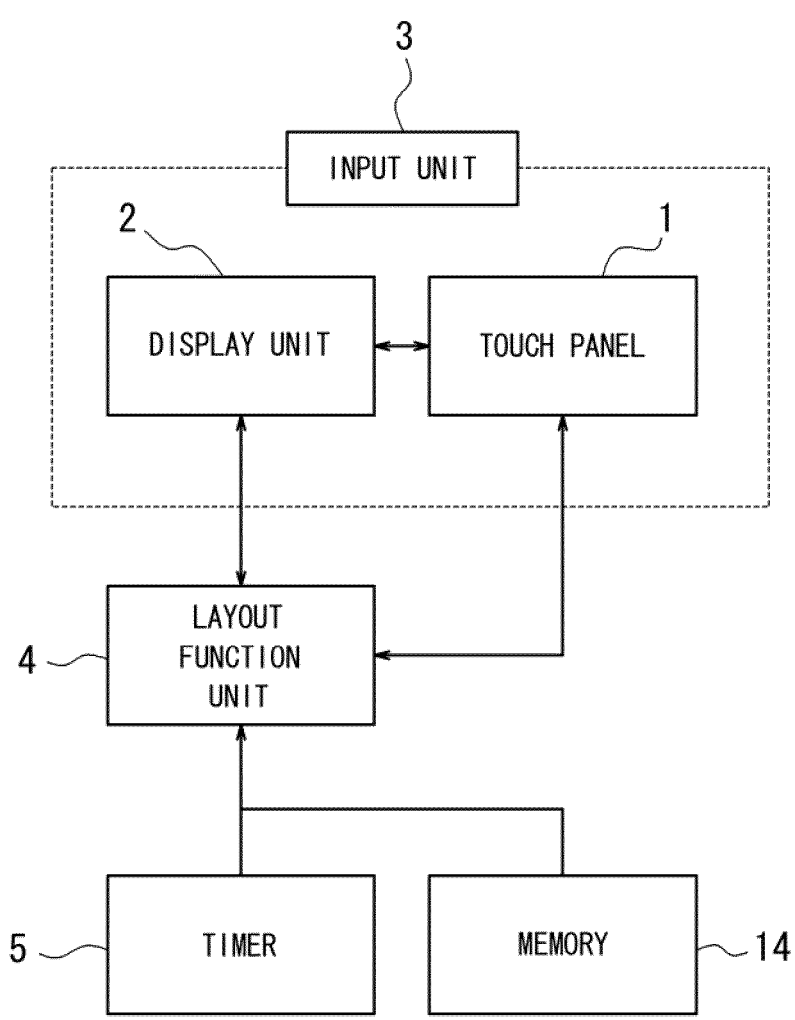
FIG. 1 is a block diagram illustrating an example of an input terminal apparatus in accordance with the present invention.

Embodiments of the present invention will be described with reference to the accompanying drawings. FIG. 1 is a block diagram illustrating an example of an input terminal apparatus in accordance with the present invention. The input terminal apparatus in accordance with the present invention is applicable to compact-sized mobile devices such as a cellular phone, a PDA (Personal Digital Assistant) and the likes. The input terminal apparatus shown in FIG. 1 is provided with a display unit 2 for displaying a plurality of input keys to receive input, a touch panel 1 disposed in association with the display unit 2 and in front of the display unit 2, a layout function unit (display control unit) 4 for controlling activation of the display unit 2, a timer 5 and a memory 14. The touch panel 1 and the display unit 2 function as an input unit 3.

The layout function unit 4 controls the display unit 2 to display a first input key group (a key group set to be displayed dedicatedly for when the display unit 2 is activated) at the activation of the display unit 2 and, after a predetermined period of time from the activation of the display unit 2, to change the display from the first input key group to a second input key group (a key group set as a default display of the display unit 2). It is to be noted that the "at the activation" indicates the time at which the display unit 2 is activated from a sleep mode, a power save mode, a screensaver and the likes, or the time at which the display unit is activated by a folding housing being opened.

Figure 2:
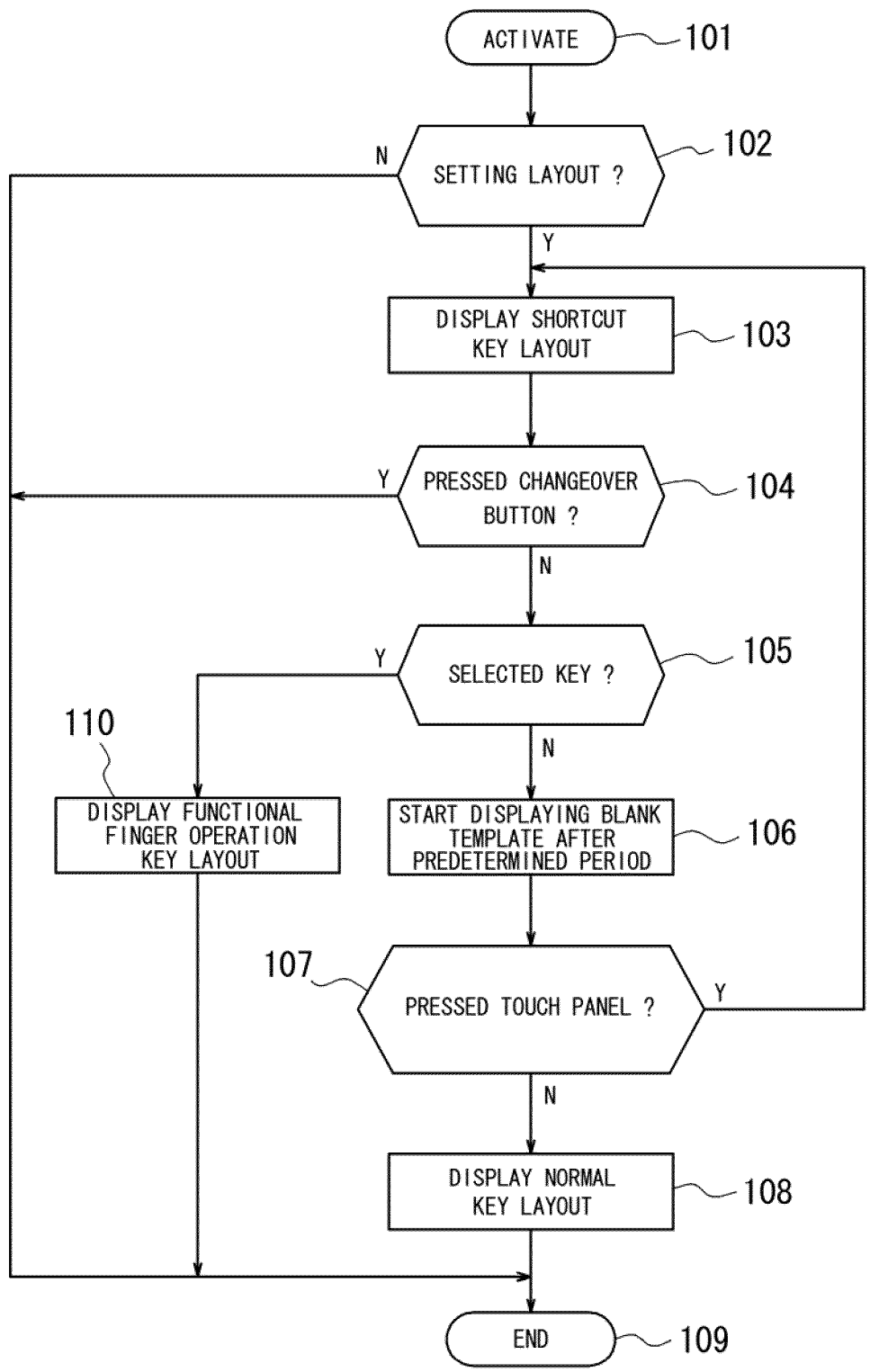
FIG. 2 is a flow chart illustrating an operation of the input terminal apparatus in accordance with the present invention.

FIG. 2 is a flow chart illustrating an operation of the input terminal apparatus in accordance with the present invention. The operation of the input terminal apparatus will be described with reference to a key layout displayed on the display unit of the cellular phone shown in FIG. 3 as an example. First, when the display unit 2 is activated from the sleep mode, the power save mode or the screensaver or activated by the folding housing being opened (step 101), the layout function unit 4 determines whether a user is setting a shortcut key layout (step 102).

When the user is not setting the shortcut key layout at the step 102, the layout function unit 4 displays a normal key layout to be operated by use of a stylus and then ends the operation (step 109). When the user is setting the shortcut key layout, the layout function unit 4 displays the shortcut key layout (step 102).

Figure 3:
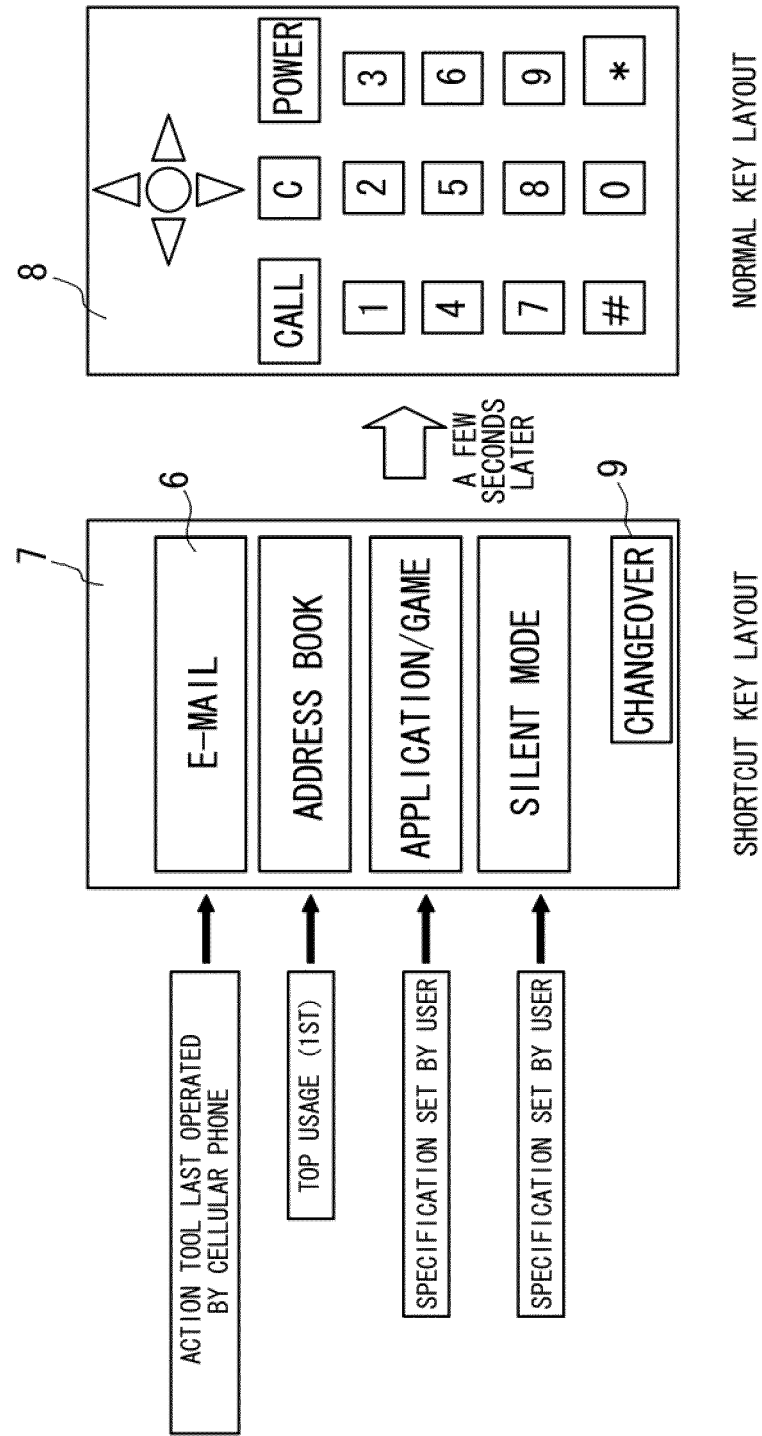
FIG. 3 is a diagram illustrating examples of key layouts displayed on a display unit.

FIG. 3 shows examples of the shortcut key layout and the normal key layout. In a shortcut key layout 7, shortcut keys 6 for e-mail, address book, application/game and silent mode are arranged. In a normal key layout 8, numeric keys, arrow keys and the likes are arranged.

The user can designate the number of the shortcut keys 6 to be displayed. Moreover, the user can designate all shortcut keys 6 to be displayed. The layout function unit 4 displays a shortcut key 6 assigned with a function in association with activation of an application last ended in an upper area of the shortcut key layout 7. For example, in a case where a function for e-mail is last used, the layout function unit 4 displays the shortcut key 6 for e-mail in the top area of the shortcut key layout 7. In addition, when an e-mail is received prior to the activation, the layout function unit 4 displays the shortcut key 6 for in-box in the top area. Furthermore, the layout function unit 4 determines functions frequently used by the user and displays shortcut keys 6 assigned with the functions in association with activations of the applications frequently used by the user from the top area in the order most frequently used.

It is to be noted that, when the user desires to use the normal key layout 8 when the shortcut key layout 7 is displayed, the user can immediately change the layout to the normal key layout 8 by pressing a changeover button 9.

The input unit 3 determines whether the changeover button 9 shown in FIG. 3 is pressed when the shortcut key layout 7 is displayed (step 104). When the changeover button 9 is pressed, the layout function unit 4 displays the normal key layout 8 and ends the operation (step 109). When the changeover button 9 is not pressed, the input unit 3 determines whether the shortcut key 6 in the shortcut key layout 7 is selected (step 105). When the shortcut key 6 is selected, the layout function unit 4 displays a finger operation key layout 11 (see FIG. 4) corresponding to the function or the tool of the shortcut key 6 selected (step 110) and then ends the operation (step 109).

Figure 4:
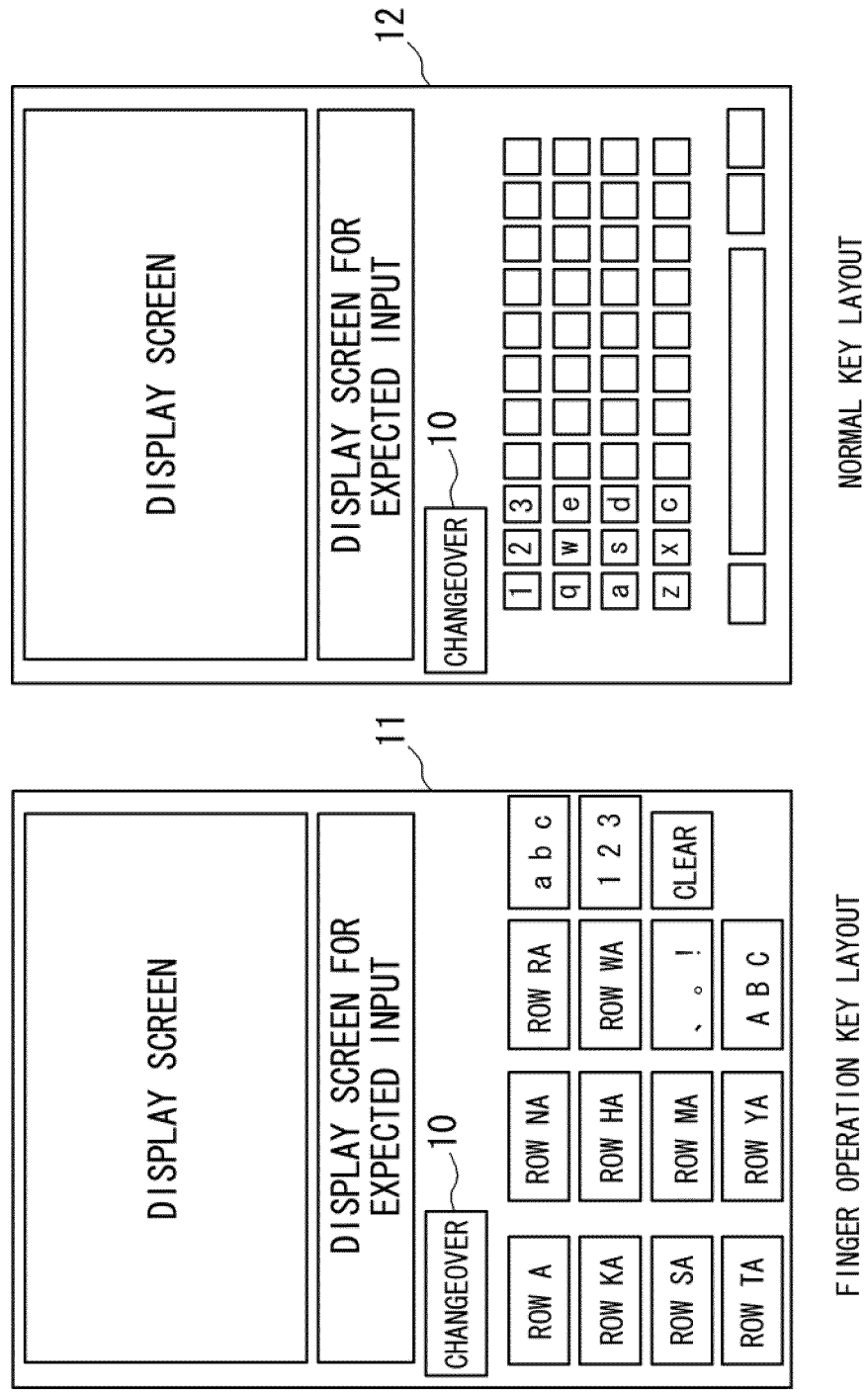
FIG. 4 is a diagram illustrating examples of a finger operation key layout and a normal key layout on an e-mail operation screen.

FIG. 4 is a diagram illustrating examples of a finger operation key layout of an e-mail operation screen, which corresponds to the function or the tool of the shortcut key selected, and a normal key layout of the e-mail operation screen. When the shortcut key 6 is selected, factors such as "a quick operation" and "a finger operation" may be expected. Thus, the layout function unit 4 displays the finger operation key layout 11 corresponding to the tool or the application selected by the shortcut key 6. Hence, the user in a hurry does not need to take the stylus out. In addition, since the user can change the layout to the normal operation key layout 12, which is operated by the stylus or the like, by pressing the changeover button 10, it is possible to match the key layout to the user's taste.

When the shortcut key 6 is not selected at the step 105, the timer 5 determines a period of time of displaying the shortcut key 6, which can be set by the user as desired. When a predetermine period of time has passed without a selection of the changeover button 9 or the shortcut key 6, the layout function unit 4 starts a shift to the normal key layout (step 106) via a blank template 13 (see FIG. 5). Then, the input unit 3 determines whether the touch panel 1 is pressed during the shift to the blank template 13 or a display of the blank template 13 (step 107).

Figure 5:
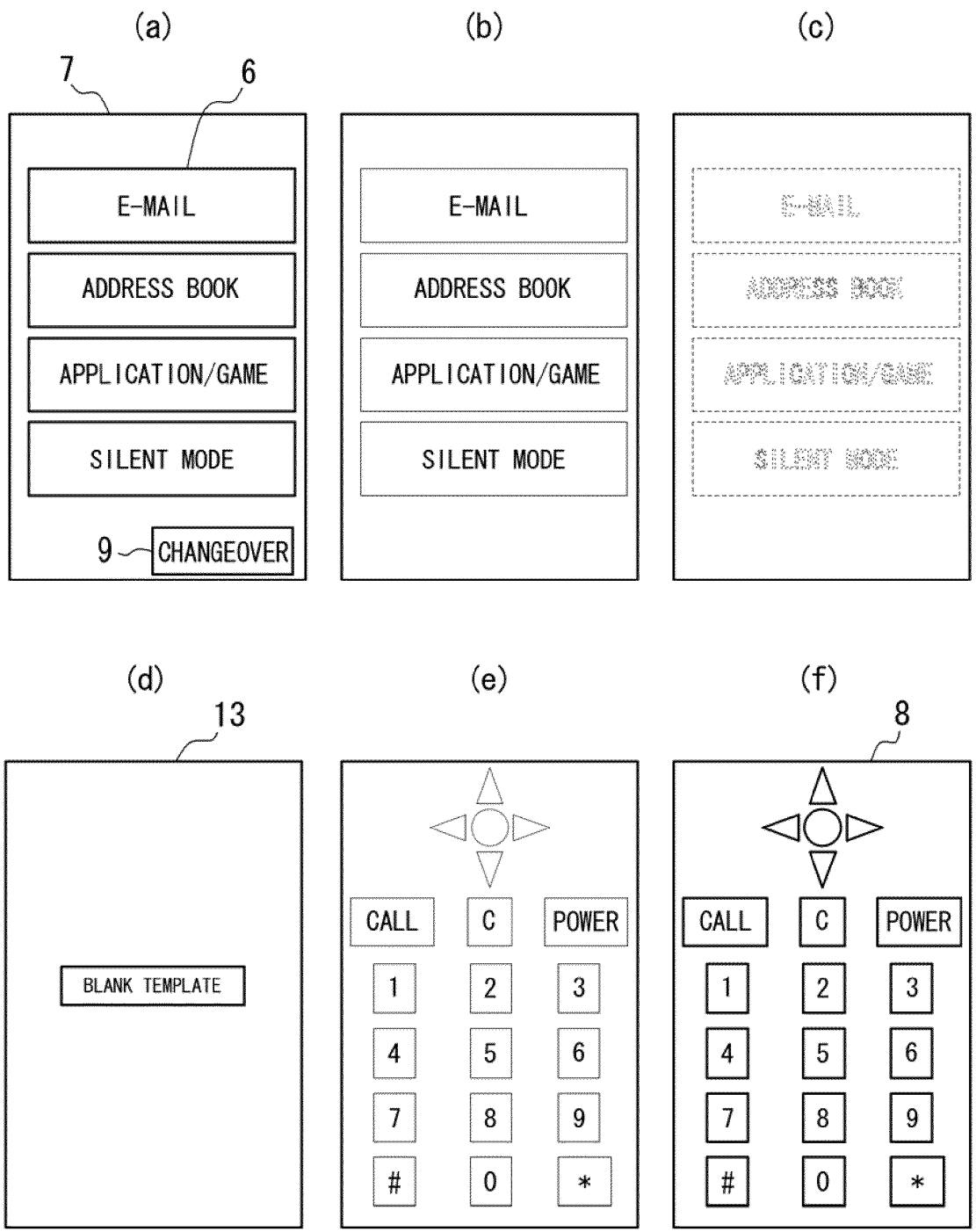
FIG. 5 is a diagram illustrating an example of a display of a shift from a shortcut key layout to the normal key layout.

FIG. 5 is a diagram illustrating an example of a shift from the shortcut key layout to the normal key layout: (a) is the shortcut key layout 7; (b) is a pale shortcut key layout 7; (c) is a very pale shortcut key layout 7; (d) is the blank template 13; (e) is a pale normal key layout 8; and (f) is the normal key layout 8. The shift from the shortcut key layout to the normal key layout moves in alphabetical order.

Here it is considered a case where the display of the key layout shifts from (a) directly to (f) without passing through (b), (c), (d) and (e). There sometimes happens that the display immediately changes from the shortcut key layout 7 to the normal key layout 8 at timing when the user selects the shortcut key 6. When the user presses the touch panel 1 at timing of the changeover, the user selects the normal key layout 8 in spite of intending to select the shortcut key 6, which results in an unintended operation. Thus, the layout function unit 4 inserts the blank template 13, in which there is no display, to prevent an immediate change to the normal key layout 8. By inserting the blank template 13, the layout function unit 4 can prevent the user from pressing the normal key layout 8 even if the user selects the shortcut key 6 at the timing of the changeover, and thus prevents an unintended operation.

When the input unit 3 determines as that the touch panel 1 is pressed during the shift to the blank template 13 (FIGS. 5(b), (c)) or during the display of the blank template 13 (FIG. 5(d)), it is regarded as that the user intended to select the shortcut key 6, and thus the operation goes back to the step 102 and the layout function unit 4 displays the shortcut key layout 7.

When the touch panel 1 is not pressed during the shift to the blank template 13 or the display of the blank template 13, the layout function unit 4 displays the normal key layout (step 108) and then ends the operation (step 109).

Figure 6:
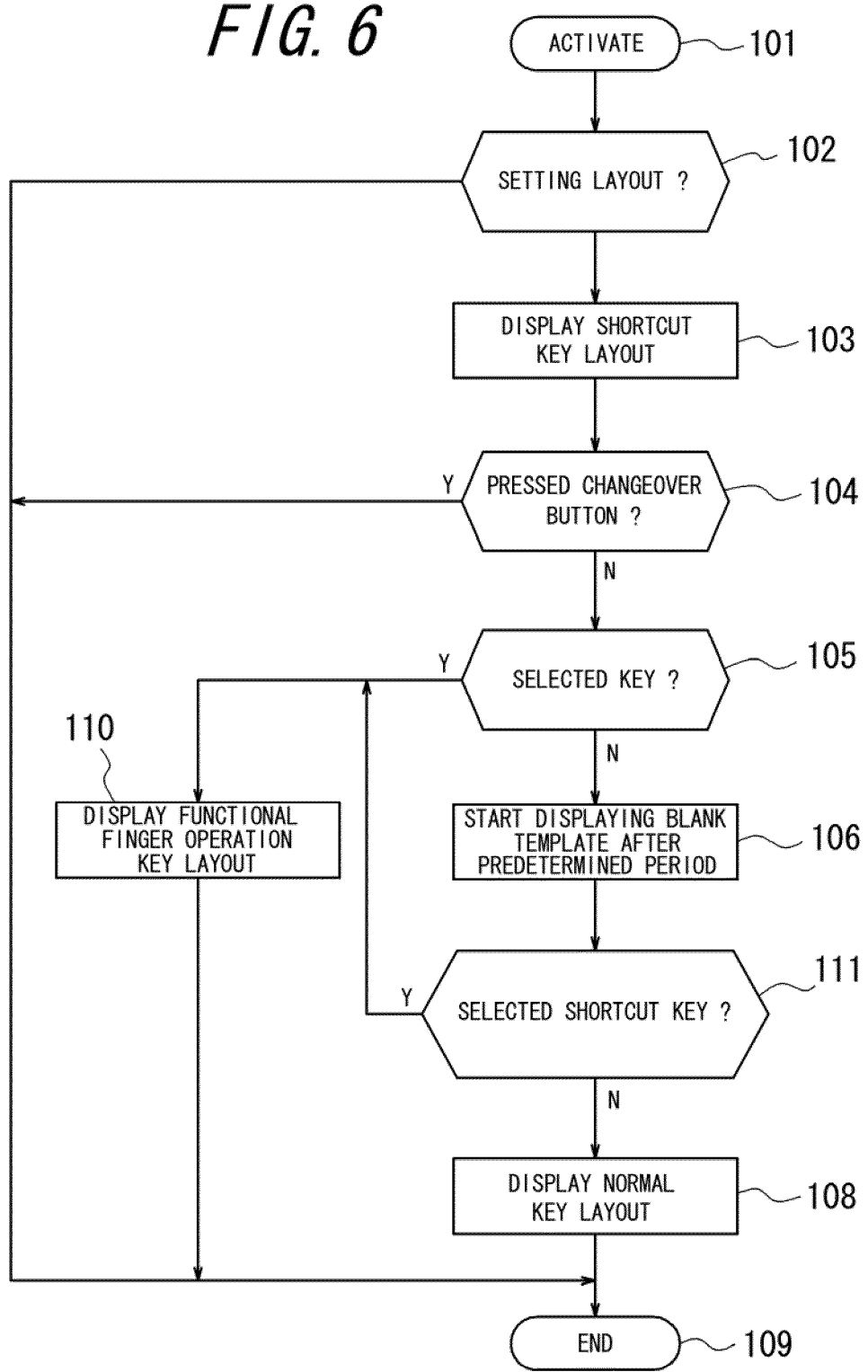
FIG. 6 is a flow chart illustrating an operation in a case where a touch panel is pressed and that is regarded as a selection of a shortcut key.
Figure 7:
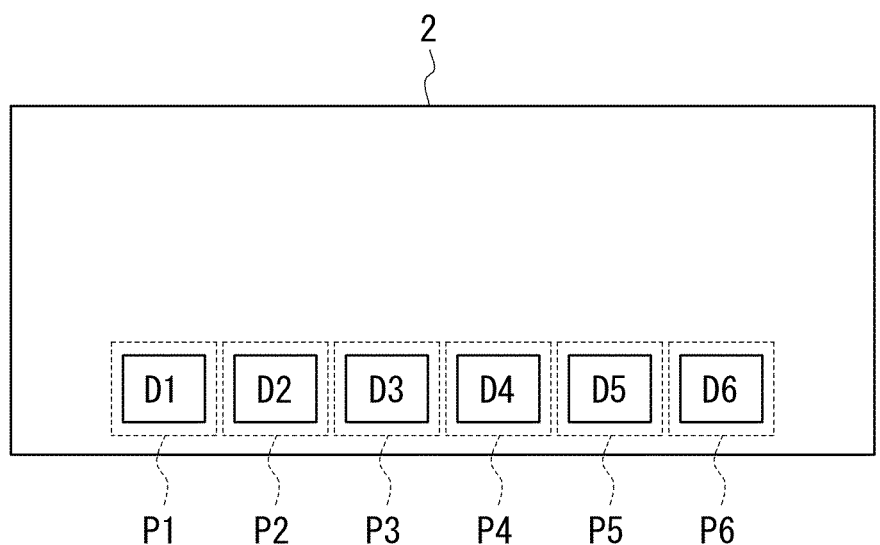
FIG. 7 is a diagram illustrating an example of a conventional touch panel.

In addition, when the touch panel 1 is pressed during the shift to the blank template 13 or the display of the blank template 13, it may be regarded as that the user intended to select the shortcut key 6 and the layout function unit 4 may start the function or the tool of the shortcut key corresponding to a pressed position on the touch panel 1. FIG. 6 is a flow chart illustrating an operation in a case where a touch panel is pressed during the shift to the blank template or the display of the blank template and that is regarded as a selection of the shortcut key.

At a step 111 in the flow chart shown in FIG. 6, the input unit 3 determines whether the touch panel 1 is pressed to select the shortcut key 6 during the shift to the blank template 13 (FIGS. 5(b), (c)) or during the display of the blank template 13 (FIG. 5(d)). When it is determined that the touch panel 1 is pressed, the input unit 3 regards the operation as that the shortcut key 6 corresponding to the pressed position on the touch panel 1 is selected, and the layout function unit 4 displays the finger operation key layout 11 (see FIG. 4) corresponding to the function or the tool of the shortcut key 6 selected and then ends the operation (step 109).

When it is determined that the touch panel 1 is not pressed during the shift to the blank template 13 or the display of the blank template 13, the input unit 3 regards the situation as that the shortcut key 6 is not selected, and the layout function unit 4 displays the normal key layout (step 108) and then ends the operation (step 109).

When the display is shifted from the shortcut key layout to the normal key layout, the display may be changed by performing fade-out and fade-in such as the display of (a), (b), (c), (d), (e), (f) shifted in the described order as shown in FIG. 5. Moreover, it is possible to replace an effect of the blank template 13 with an effect of the fade-out of (b), (c) so that the display shifts in the order (a), (b), (c), (e) and then (f), instead of inserting the blank template 13. Furthermore, it is also possible to insert only the blank template 13 between (a) and (f).

As described above, in accordance with the present invention, since the shortcut key is displayed for a few seconds after the activation of the display unit for displaying the key group to receive a user's operation and before a display of the normal key layout, it is possible to deal with a sudden operation by the user. The user can set a plurality of shortcut keys to be displayed and, since the shortcut keys are displayed for the few seconds after the activation, there causes no influence on the display set by the user. In addition, it is possible to display not only items of the shortcut keys set by the user as desired but also items in the order of most frequently used or an item for the tool last used. Accordingly, the present invention can deal with a case which displays items other than shortcut keys set by the user.

In addition, factors such as the "quick operation" and the "finger operation" are expected when the shortcut key is selected. In accordance with the present invention, since the tool or the application selected by the shortcut key is displayed in the finger operation key layout, it is not necessary for the user in a hurry to take the stylus out. Moreover, in accordance with the present invention, since it is possible to change the display to the normal operation key layout to be operated by use of the stylus and the likes, the user can set the key layout as desired.

Furthermore, if the shortcut key layout is immediately changed to the normal key layout, and when the user presses the touch panel at the changeover, the key in the normal key layout is selected in spite of user's intention to select the shortcut key, which may lead to the unintended operation. However, in accordance with the present invention, since the blank template is inserted so as to preclude an immediate changeover and, when the blank template is pressed, the display goes back to the shortcut key layout or the tool corresponding to the shortcut key selected is started. Therefore, it is possible to prevent the unintended operation.

The invention claimed is:

1. An input terminal apparatus comprising:
a display unit for displaying a plurality of input keys to receive input;
a touch panel disposed in association with the display unit and in front of the display unit; and
a display control unit for controlling activation of the display unit,
wherein the display control unit controls the display unit to display a first input key group to prompt input to the touch panel at activation of the display unit from an inactive state to an active state and, if the display control unit determines that a predetermined period of time has elapsed from the activation of the display unit without receiving the input from the input keys, to change a display from the first input key group to prompt input to the touch panel to a second input key group to prompt input to the touch panel
wherein neither said first input key group nor said second input key group are shown at said inactive state, and
wherein the key layout of the first input key group is different from the key layout of the second input key group.

2. The input terminal apparatus according to claim 1, wherein a predetermined image is inserted as a changeover screen when changing the display from the first input key group to the second input key group.

3. The input terminal apparatus according to claim 2, wherein when input to the touch panel is detected during a display of the changeover screen, the changeover of the display to the second input key group is cancelled and the first input key group is displayed.

4. The input terminal apparatus according to claim 2, wherein when input to the touch panel is detected during a display of the changeover screen, the input is received as input corresponding to the first input key group.

5. The input terminal apparatus according to claim 1, wherein the first input key group is set to be displayed dedicatedly for when the display unit is activated, while the second input key group is set as a default display of the display unit.

6. The input terminal apparatus according to claim 1, wherein the first input key group is configured so that a function assigned to a key can be changed.

7. The input terminal apparatus according to claim 6, wherein the first input key group includes a key assigned with a function in association with activation of an application last ended.

8. The input terminal apparatus according to claim 6, wherein the first input key group includes a key assigned with a function in association with activation of an application most frequently used.

9. The input terminal apparatus according to claim 1, wherein the size of the keys of the second key group is smaller than that of the first key group.

10. The input terminal apparatus according to claim 1, wherein the number of the keys of the first key group is smaller than that of the second key group.

11. The input terminal apparatus according to claim 9, wherein the number of the keys of the first key group is smaller than that of the second key group.

12. The input terminal apparatus according to claim 1, wherein the inactive state includes a sleep mode.

13. The input terminal apparatus according to claim 1, wherein the inactive state includes a power save mode.

14. The input terminal apparatus according to claim 1, wherein the inactive state includes a screen saver mode.

15. An input terminal apparatus comprising:
a display unit for displaying a plurality of input keys to receive input;
a touch panel disposed in association with the display unit and in front of the display unit; and
a display control unit for controlling activation of the display unit,
wherein the display control unit controls the display unit to display a first input key group to prompt input to the touch panel at activation of the display unit from an inactive state to an active state and, if the display control unit determines that an input by a change key is preformed, to change a display from the first input key group to prompt input to the touch panel to a second input key group to prompt input to the touch panel,
wherein neither said first input key group nor said second input key group are shown at said inactive state,
wherein the change key is not contained in the second input key group, and
wherein the key layout of the first input key group is different from the key layout of the second input key group.

16. The input terminal apparatus according to claim 15, wherein the first input key group contains a key for performing a predetermined application.

* * * * *